United States Patent [19]

van den Berg

[11] 4,343,062
[45] Aug. 10, 1982

[54] DEVICE FOR CONNECTING A WIPER BLADE HOLDER TO A WIPER ARM

[75] Inventor: Johan H. van den Berg, Hasselt, Belgium

[73] Assignee: Champion Spark Plug Europe S.A., Virton, Belgium

[21] Appl. No.: 81,681

[22] Filed: Oct. 4, 1979

[30] Foreign Application Priority Data

Oct. 19, 1978 [FR] France ............................... 78 29787

[51] Int. Cl.³ ............................................. B60S 1/40
[52] U.S. Cl. .................................. 15/250.32; 403/329
[58] Field of Search ............................. 403/329, 328; 15/250.32–250.35, 250.42

[56] References Cited

U.S. PATENT DOCUMENTS

| 2,861,290 | 11/1958 | Hoyler | 15/250.32 |
| 3,593,362 | 7/1971 | Arman | 15/250.32 |
| 3,629,897 | 12/1971 | Arman | 15/250.32 |
| 4,094,039 | 6/1978 | Waterman et al. | 15/250.32 |

FOREIGN PATENT DOCUMENTS

| 1251670 | 10/1967 | Fed. Rep. of Germany | 15/250.32 |
| 1655034 | 7/1971 | Fed. Rep. of Germany | 15/250.32 |
| 2340481 | 2/1976 | Fed. Rep. of Germany | 15/250.32 |
| 2701350 | 3/1978 | Fed. Rep. of Germany | 15/250.32 |
| 2735332 | 2/1979 | Fed. Rep. of Germany | |
| 2753117 | 6/1979 | Fed. Rep. of Germany | 15/250.32 |
| 2810210 | 9/1979 | Fed. Rep. of Germany | 15/250.32 |
| 2399340 | 9/1979 | France | |

*Primary Examiner*—James Kee Chi
*Attorney, Agent, or Firm*—Wegner, McCord, Wood & Dalton

[57] ABSTRACT

An adaptor (30, 130, 230, 530, 630) is provided for connecting different style windshield wiper arm ends (20, 120, 220, 220A, 320, 420, 520, 620) to a cross-pin-type wiper blade (25) using the same principle of operation for locking the different style arm ends to the adaptor (30, 130, 230, 530, 630) prior to assembling the adaptor on the blade (25). A latch member (45, 145, 245, 545, 645) carried by a leaf spring (41, 141, 241, 541, 641) engages with and retains any one of several different style arm ends (20, 120, 220, 220A, 320, 420, 520, 620) on the adaptor (30, 130, 230, 530, 630) with another latch member (44, 144, 244, 544, 644) dependent from said leaf spring (41, 141, 241, 541, 641) which cooperates with the cross-pin (26) of the cross-pin-type blade (25) to prevent the latching member (45, 145, 245, 545, 645) from releasing the arm end (20, 120, 220, 220A, 320, 420, 520, 620) when the adaptor (30, 130, 230, 530, 630) is assembled on said cross-pin (26).

17 Claims, 27 Drawing Figures

DEVICE FOR CONNECTING A WIPER BLADE HOLDER TO A WIPER ARM

TECHNICAL FIELD

This invention relates to a connection between a windshield wiper arm and a windshield wiper blade and, more particularly, to an adaptor for connecting different style windshield wiper arm ends to a cross-pin-type wiper blade.

BACKGROUND ART

Adaptors have been used for many years to create an appropriate connection between a wiper blade and a wiper arm that have incompatible connectors built onto the arm end and onto the blade.

An adaptor is an intermediate component between the wiper blade on the one side and the wiper arm on the other side and, necessarily, comprises two parts, i.e. a first part designed in such a way that it may be removably fitted to the wiper blade and a second part designed in such a way that it may be removably fitted to the wiper arm. The adaptor should be designed in such a way that there is relatively no linear displacement between the wiper blade and the wiper arm while a limited degree of rotation of the blade with respect to the arm is permissible. Unfortunately, there are on the market not only many different types of wiper blades having different styles and dimensions of connectors for connection to an arm, but also there are many different types of wiper arms having different styles and dimensions of connectors for connection to a blade.

One of the results of the large number of types of connectors is the fact that the consumer has great difficulty buying a wiper blade with the right connector that will correspond with the wiper arm mounted on his car. Moreover, the replacement market is very complex requiring dealers to stock not only a large number of types of wiper blades, but also a large number of types of adaptors for converting the different style arm ends to the appropriate wiper blade.

In practice, dealers very often sell, with each wiper blade of a given type and dimension, up to five different adaptors in order to be sure that the consumer gets the adaptor he needs. In spite of all the efforts of the dealers, the consumer is not always satisfied because, in most cases, the principle applied for mounting the adaptor on the wiper blade and on the wiper arm is different for each adaptor and especially for mounting the adaptor on the wiper arm. These mounting difficulties are very real and very frustrating for most consumers.

DISCLOSURE OF INVENTION

The present invention is directed to overcoming one or more of the problems as set forth above.

The present invention overcomes the problems of the prior art and provides an adaptor that makes use of the same principle for mounting several different types or styles of wiper arm ends to a wiper blade.

The adaptor according to the invention comprises a body having an upper portion to receive the free end portion of the wiper arm while a lower portion is designed for fitting said adaptor onto the wiper blade. The upper portion includes a cavity shaped to conform to the free end portion of the wiper arm. Said cavity is separated from the lower portion by a spring or a flexible blade which, on its upper surface, is provided with a latch or blocking means which engages with the end of the wiper arm to prevent any disengagement of the wiper arm when another latch or blocking means, provided on the lower surface of the spring or flexible blade, is in contact with the cross-pin or rivet of the wiper blade with the adaptor mounted on said cross-pin or rivet of the wiper blade.

The adaptor is simple in construction whereby it is easily fitted to and removed from the wiper blade as well as from the wiper arm. The adaptor is made of a molded plastic material which makes it relatively inexpensive. In many embodiments of the invention, the structure of the adaptor has the longitudinal axis of the free end portion of the wiper arm exactly above the longitudinal axis of the wiper blade, even with wiper arms which were designed basically for lateral connection to the wiper blade. Aligning the axis of the arm above the axis of the blade improves the wiping quality of the wiper blade because the lateral torsional movement between the center of the arm and the center of the blade is eliminated.

BEST MODE FOR CARRYING OUT THE INVENTION

Figures 1, 2:
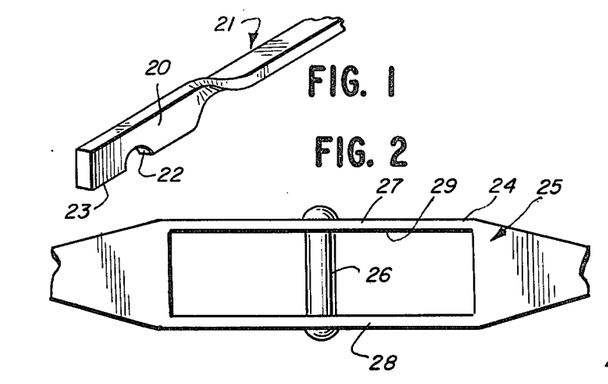
FIG. 1 is a perspective view of a first type of wiper arm which may be mounted on an adaptor incorporating the invention.
FIG. 2 is a top plan view of the connector portion of a wiper blade.
Figure 3:
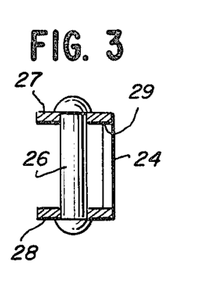
FIG. 3 is a sectional view taken along the line 3—3 of FIG. 2.

FIG. 1 shows a windshield wiper arm 21 having a free end portion 20. The end portion 20 is comprised of a flat bar having its long axis extending vertically with a transversely extending cutout or recess 22 formed in the lower, downwardly facing edge 23, thereof. The connector portion 24 of a windshield wiper blade 25 is shown in FIGS. 2 and 3 wherein a cross-pin or rivet 26 extends transverse to spaced side walls 27,28 defining an opening 29 formed in said blade 25. The style or type of end portion 20 of the arm 21 clearly cannot be connected to the cross-pin 26 of the wiper blade 25 thereby creating the necessity for an improved adaptor 30 shown in FIGS. 4 through 7, inclusive.

Figure 4:
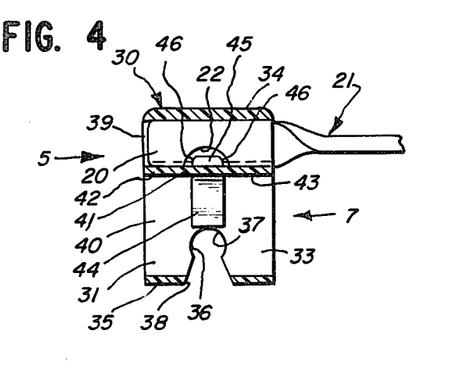
FIG. 4 is a sectional view of the improved adaptor taken along the line 4—4 of FIG. 5.
Figure 5:
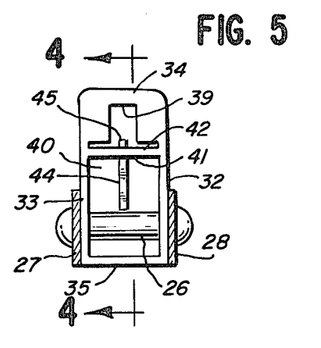
FIG. 5 is a view looking in the direction of the arrow 5 of FIG. 4.
Figure 6:
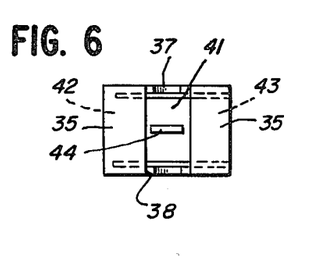
FIG. 6 is a bottom view of FIG. 4.
Figure 7:
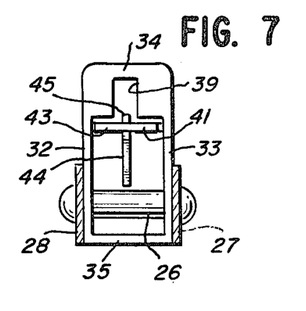
FIG. 7 is a view looking in the direction of the arrow 7 of FIG. 4.

The adaptor 30 comprises a body 31 having a pair of side walls 32,33 joined together by a top wall 34 and a bottom wall 35. A keyhole-shaped opening 37 is formed in each wall 32,33 of the body 31 with the bottoms of the keyholes 37 forming an opening 38 through the bottom wall 35. The body 31 is divided into an upper cavity or portion 39 and a lower cavity or portion 40, these two portions being vertically separated by a leaf spring 41 which may be flat and is secured at one end 42 to the spaced side walls 32,33 (FIG. 5).1 The leaf spring 41 has a free end portion 43 spaced from the secured end 42 thereof. As illustrated, the free end portion 43 of the spring 41 is at the end of the adaptor 30 into which the arm end 20 is introduced into the adaptor. As shown in FIG. 5, the width of the opening in the upper cavity or portion 39 is relatively narrow to receive the arm end 20 in a close fit so as to prevent excessive rotation of the adaptor 30 relative to the arm 21.

The leaf spring 41 is provided with a first latch or blocking member 44 which depends from a movable portion of said leaf spring 41 and substantially aligns with the top of the keyholes 37 in the side walls 32,33 in the lower cavity or portion 40 of the body 31. The first latch or blocking member 44 may, for example, have the form of a non-flexible lug or plate. The leaf spring 41 is provided with a second non-flexible latch or blocking member 45 which extends upwardly from a movable portion of the leaf spring 41 and projects into the upper cavity or portion 39 of the body 31.

The mounting of the adaptor 30 on the arm 21 and to the blade 25 is performed as follows: the end portion 20 of the arm 21 is introduced axially into the upper cavity or portion 39 of the adaptor 30. During the introduction, the end 20 of the arm 21 engages with the tapered edge 46 of the second latch or blocking member 45 to flex the leaf spring 41 downwardly until the second latch or blocking member 45 enters into the cutout or recess 22 of the wiper arm 21 whereupon the leaf spring 41 flexes upwardly against the lower edge 23 of the arm 21. The adaptor 30, with the arm 21 attached, is then snap-fit onto the cross-pin or rivet 26 of the wiper blade 25 by introducing said cross-pin 26 through the opening 38 in the bottom wall 35 and forcing the cross-pin 26 past the constriction in the keyhole-shaped openings 37 and seats in the enlarged eye 36 of the keyhole. Once the cross-pin 26 is in the eye or seat 36, it abuts against or is in close proximity to the first latch or blocking member 44. The leaf spring 41, second latch or blocking member 45, and arm end 20 cannot move downward relative to cross-pin 26 on the blade 25. Therefore, the second latch or blocking member 45 cannot move out of the recess 22 in the arm end 20 so that the arm end 20 is locked to the adaptor 30 as long as the adaptor 30 is assembled on the cross-pin 26.

Figures 8, 9:
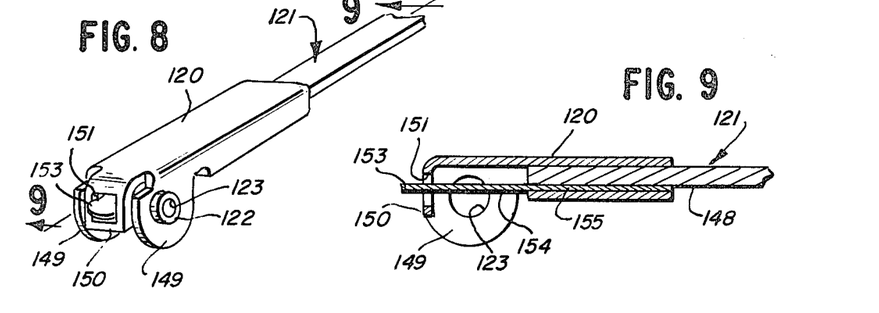
FIG. 8 is a perspective view of a second type of wiper arm which may be mounted on the improved adaptor according to the invention.
FIG. 9 is a sectional view taken along the line 9—9 of FIG. 8.

FIGS. 10 through 14 show a second embodiment of the improved adaptor 130 for use on the wiper arm 121 of FIGS. 8 and 9. The free end portion 120 of the wiper arm 121 has a U-shaped opening facing downwardly relative to the length of the arm 121. A pair of hollow lugs 122 project outward from the legs 149 of the "U" so that openings 123 in said lugs 122 align with each other. A tab 150 depends downward between the legs 149 of the "U" and has a frontal opening 151 through which the free end 153 of a leaf spring 154 projects. The leaf spring 154 is anchored at 155 on the arm end 120 and cuts across the aligned openings 123 in the lugs 122.

The adaptor 130 of FIGS. 10 through 14 has a body 131 having side walls 132,133 joined together by a top wall 134 and a bottom wall 135. A keyhole-shaped opening 137 is formed in each wall 132,133 with the bottoms of the keyholes forming an opening 138 through the bottom wall 135. The body 131 is divided into an upper cavity or portion 139 and a lower cavity or portion 140 separated by a leaf spring 141. Spring 141 is affixed to the side walls 132,133 at one end portion 142 and is free to move freely up and down at a free end portion 143 spaced from the affixed end portion. A first latch or blocking member 144 depends downwardly from said leaf spring 141 into the lower cavity or portion 140 with the lower edge of said first latch or blocking member 144 aligning with the top edge of the keyhole-shaped openings 137.

Figure 10:
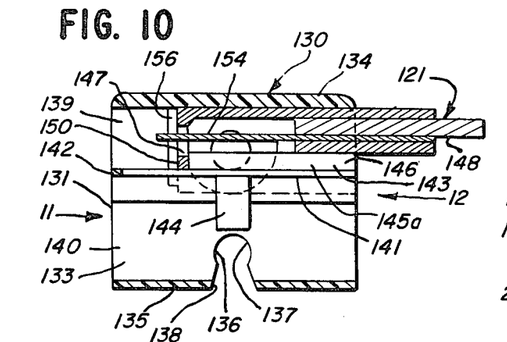
FIG. 10 is a sectional view of a modified form of adaptor taken along the line 10—10 of FIG. 11.
Figure 11:
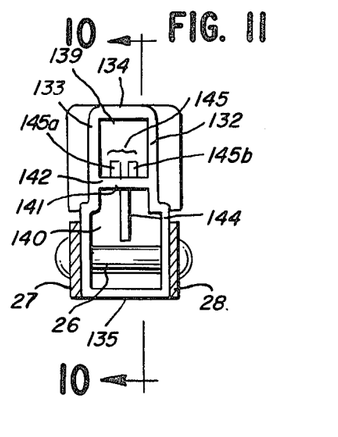
FIG. 11 is a view looking in the direction of the arrow 11 of FIG. 10.
Figure 12:
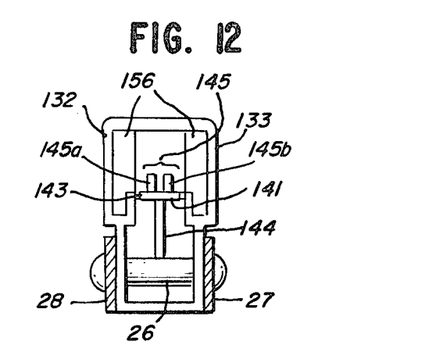
FIG. 12 is a view looking in the direction of the arrow 12 of FIG. 10.
Figure 13:
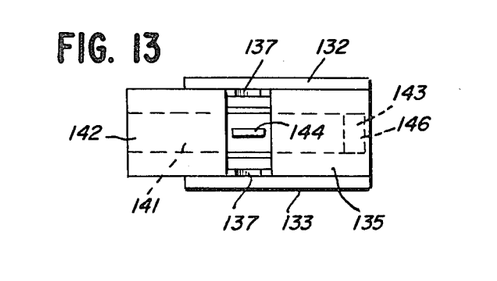
FIG. 13 is a bottom view of the adaptor of FIG. 10.
Figure 14:
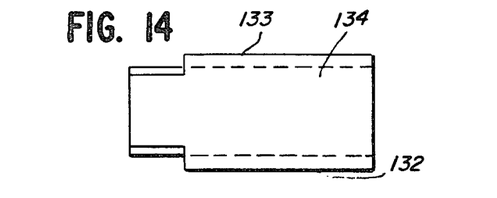
FIG. 14 is a top view of the adaptor of FIG. 10.

The upper cavity or portion 139 is provided with two spaced apart lateral stops 156 against which the tab 150 on the end of the arm 121 abuts when the arm 121 is assembled with the adaptor 130. The leaf spring 141 occupies only the central portion of the bottom of the upper cavity or portion 139 and, in particular, that portion aligned with the space between the legs 149 of the U-shaped end of the arm 121. A second latch or blocking member 145 extends upwardly from the leaf spring 141 and has a length extending from a sloped end 146 at the free end 143 of the leaf spring 141 to an abutting end 147 spaced approximately the thickness of the tab 150 from the stops 156. The second latch or blocking member 145 includes two spaced portions 145a, 145b with the abutting ends 147 of each portion 145a, 145b engaging the rear side of tab 150 of arm 121, in order to block said arm 121 against the stops 156 when an arm is assembled with the adaptor. The end portion of the second latch or blocking member 145 adjacent the sloping end 146 engages the underside 148 of the arm 121 in order to prevent rotation of said arm 121 in the upper cavity or portion 139.

The lower cavity or portion 140 of the adaptor 130 and the first latch or blocking member 144 of this second embodiment are exactly the same as the corresponding parts of the embodiment of FIGS. 4 through 8. That is, the first latch or blocking member 144 depends from and moves with the leaf spring 141. The arm 121 is assembled to the wiper blade 25 in the same way, that is, the arm end 120 is introduced into the upper cavity or portion 139 with the tab 150 engaging the sloped end 146 of the second latch or blocking member 145 to deflect the leaf spring 141 downward until the tab 150 clears the second latch or blocking member 145 and drops in between the abutting ends 147 and the stops 156 whereupon the leaf spring 141 springs up and engages the underside 148 of the arm 121. The adaptor 130 is then mounted on the wiper blade 25 by introducing the cross-pin or rivet 26 through the keyhole-shaped opening 137 into the enlarged seat 136. The cross-pin 26 abuts the first latch or blocking member 144 to prevent movement of the leaf spring 141 and second latch or blocking member 145 whereby the arm end 120 is locked to the adaptor 130.

Figure 15:
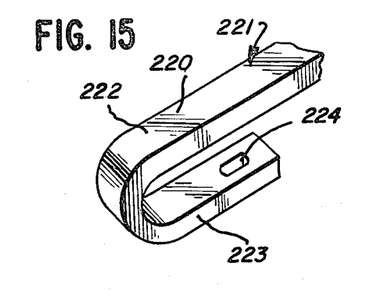
FIG. 15 is a perspective view of a third type of wiper arm which may be mounted on the improved adaptor according to the invention.
Figure 16:
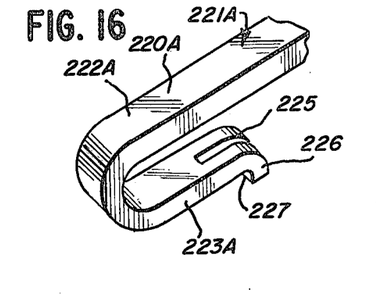
FIG. 16 is a perspective view of a fourth type of wiper arm which may be mounted on the improved adaptor according to the invention.
Figure 17:
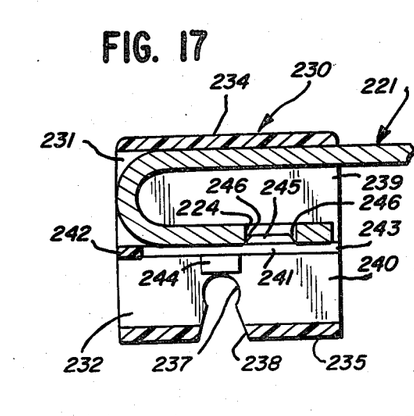
FIG. 17 is a vertical sectional view of a modified form of adaptor showing the wiper arm of FIG. 15 mounted thereon.
Figure 18:
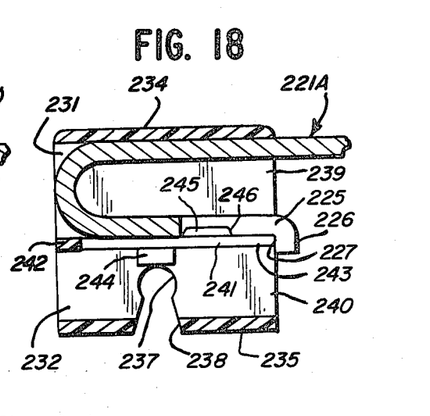
FIG. 18 is a vertical sectional view of the modified form of adaptor shown in FIG. 17 only showing the wiper arm of FIG. 16 mounted thereon.

FIGS. 17 and 18 show a third embodiment of an adaptor 230 for use with the two wiper arms 221 and 221A shown in FIGS. 15 and 16, respectively. The free end portions 220,220A of the arms 221,221A are hook-shaped and comprise an upper straight portion 222,222A and a short lower straight portion 223,223A. The wiper arm 221 of FIG. 15 further comprises a rectangular opening 224 in the lower straight portion 223 while the wiper arm 221A of FIG. 16 comprises a slot 225 and a downturned portion 226 at the end of the lower straight portion 223A. The downturned portion 226 has a rearwardly facing abutting surface 227.

The adaptor 230 of FIGS. 17,18 has a body 231 having side walls 232 joined together by a top wall 234 and a bottom wall 235. A keyhole-shaped opening 237 is formed in each wall 232 with the bottoms of the keyholes forming an opening 238 through the bottom wall 235. The body 231 is divided into an upper cavity or portion 239 and a lower cavity or portion 240 separated by a leaf spring 241. The spring 241 is affixed to the side walls 232 at one end portion 242 and is free to move freely up and down at a free end portion 243 spaced from the affixed end portion. A first latch or blocking member 244 depends downwardly from said leaf spring 241 into the lower cavity or portion 240 with the lower edge of said first latch or blocking member 244 aligning with the top edge of the keyhole-shaped opening 237.

The upper cavity or portion 239 is provided with a second latch or blocking member 245 extending upwardly from the leaf spring 241 and has a length substantially coinciding with the length of the opening 224 in the arm end 220. The fore and aft walls 246 of the second latch or blocking member 245 are sloped upwardly from the spring 241 toward each other to provide a deflecting surface for the spring 241.

Both arms 221,221A are inserted into the upper cavity 239 until the second latch or blocking member 245 of the flexible spring 241 snaps into either the rectangular opening 224 of the wiper arm 221 or into the slot 225 of the wiper arm 221A. The adaptor 230 is then mounted on the wiper blade by inserting the rivet 26 into the keyhole-shaped opening 237. The wiper arm 221 of FIG. 15 can no longer move axially with respect to the adaptor 230 because the second latch or blocking member 245 is seated in the rectangular opening 224 in the lower straight portion 223 of the arm 221 and can no longer be disconnected from the adaptor due to the first latch or blocking member 244 contacting the rivet 26 to prevent the spring from deflecting downward. The wiper arm 221A of FIG. 16 cannot move axially with respect to the adaptor because the second latch or blocking member 245 is seated in the slot 225 and the surface 227 of the downturned portion 226 abuts against the free end 243 of the spring. The arm 221A is further prevented from becoming disconnected from the adaptor due to the first latch or blocking member 244 contacting the rivet 26 to prevent the spring from deflecting downward.

It is to be noted that in FIGS. 17 and 18, the adaptor 230 has been cut along a line located in a plane extending between the spring 241 and the side wall 232 but that both arms have been shown as if cut along a center line in order to show more clearly how said arms 221,221A are fitted to the adaptor 230.

Figures 19, 20:
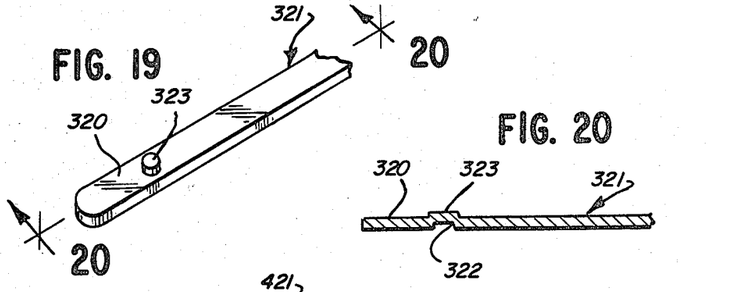
FIG. 19 is a perspective view of a fifth type of wiper arm which may be mounted on the improved adaptor according to the invention.
FIG. 20 is a sectional view along line 20—20 of FIG. 17.

FIGS. 19 and 20 show another type of wiper arm 321 with an arm end 320 which may be mounted on the adaptor according to the invention, by slightly modifying the second latch or blocking member 45 and the upper cavity or portion 39 of the first embodiment of the invention. Indeed, it will be sufficient to replace the second latch or blocking member 45 in FIG. 4 by a small boss which will fit into the recess 322 of the arm 321 of FIG. 18 and to give to the upper cavity or portion 39 a form corresponding to the size and shape of the arm end 320 of FIG. 17. On the other hand, one may also provide the upper wall of the upper cavity or portion 39 with a recess which will receive the boss 323 of FIG. 17 when the spring 41 urges the arm end 320 upward in the adaptor.

Figure 21:
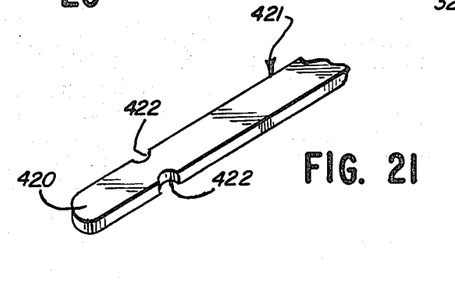
FIG. 21 is a perspective view of a sixth type of wiper arm which may be mounted on the improved adaptor according to the invention.

And still an additional type of wiper arm 421 is shown in FIG. 21 and has an arm end 420, which may be mounted on the adaptor according to the invention. Here again, it will be sufficient to adapt the upper cavity or portion 39 and the second latch or blocking member 45 of the first embodiment to the characteristics of the wiper arm end 420 of FIG. 21 in, for example, providing the second latch or blocking member 45 in the form of two semi-circular bosses which will place themselves into the two recesses 422 of the arm end 420.

Figure 22:
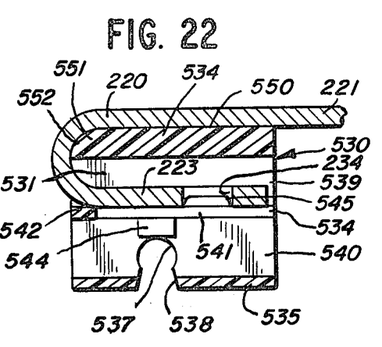
FIG. 22 is a vertical sectional view of a modified form of adaptor showing the wiper arm of FIG. 15 mounted thereon.
Figure 23:
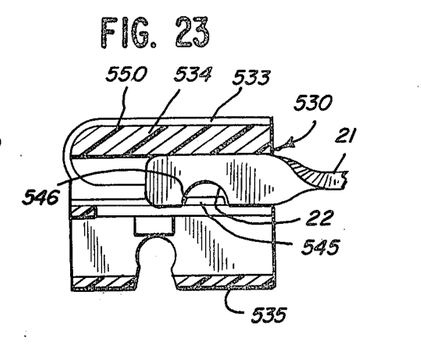
FIG. 23 is a vertical sectional view of the modified form of adaptor shown in FIG. 22 only showing the wiper arm of FIG. 1 mounted thereon.

FIGS. 22 through 25 show a fourth embodiment of the adaptor 530 corresponding to the wiper arms 221 and 21 of FIGS. 15 and 1, respectively. In FIGS. 22 and 23, the adaptor 530 has also been cut along a line located in a plane extending between the spring 541 and the side wall 532, but the hook-shaped wiper arm 221 has been cut along a center line thereof.

Figure 24:
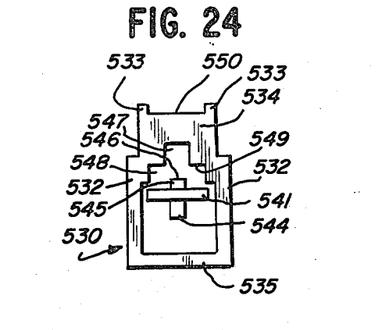
FIG. 24 is a right side view of FIG. 23 looking in the direction of the arrow 24 of FIG. 23.
Figure 25:
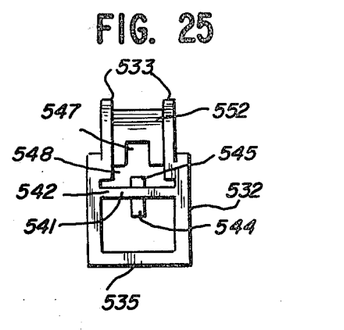
FIG. 25 is a left side view of FIG. 22 looking in the direction of the arrow 25 of FIG. 22.

The adaptor 530 of FIGS. 22 through 25 has a body 531 with side walls 532 having offset portions (FIG. 24) joined together by a top wall 534 and a bottom wall 535. The side walls 532 extend a short distance 533 above the top wall 534 so as to define a three-sided recess 550 therebetween, as best shown in FIGS. 24 and 25. The top wall 534 has a front portion 551 arcuately curved at 552 with the curve 552 substantially conforming to the inside curvature of the hook end of a hook-end wiper arm 221 or 221A. A keyhole-shaped opening 537 is formed in each side wall 532 with the bottoms of the keyholes forming an opening 538 to the bottom wall 535. The body 531 is divided into an upper cavity or portion 539 and a lower cavity or portion 540 separated by a leaf spring 541. The spring 541 is affixed to the side walls 532 at one end portion 542 and is free to move up and down at a free end portion 543 spaced from the affixed end portion. A first latch or blocking member 544 depends downwardly from said leaf spring 541 into the lower cavity or portion 540 with the lower edge of said first latch or blocking member 544 aligning with the top edge of the keyhole-shaped opening 537.

The upper cavity or portion 539 is provided with a second latch or blocking member 545 extending upwardly from the leaf spring 541 and has a length substantially coinciding with the length of the opening 224 in the arm end 220. The fore and aft walls 546 of the second latch or blocking member 545 are sloped upwardly from the spring 541 toward each other to provide a deflecting surface for the spring 541. As viewed in the end views of FIGS. 24 and 25, the upper cavity or portion 539 is subdivided into an upper reduced width channel 547 and a wider or extended width lower channel 548. The channels 547 and 548 communicate throughout their lengths to provide shoulders 549 facing the leaf spring 541.

The way to attach the adaptor 530 to the wiper blade 25 is the same as in all preceding embodiments. The way to lock the lower straight portion 223 of the hook-shaped arm 221 to the adaptor is the same as in FIG. 17 except that instead of the arm end 220 being inserted into the upper cavity or portion 539 from the right or rear side of the adaptor 530, the top wall 534 of the adaptor 530 is threaded into the rear of the hook end 220 with the lower straight portion 223 of the arm being threaded into the lower enlarged channel 548 with the shoulders 549 bearing on the top of the portion 223 and the second latch or blocking member 545 seating in the opening 224 of the arm. The arm 21 of FIG. 1 is assembled to the adaptor 530, as shown in FIG. 23, in the same manner as is shown in FIG. 4, except that the second latch or blocking member 545 is displaced away from the center of the adaptor 530. The end of the arm 21 is guided into the narrow upper channel 547 of the adaptor 530 to displace the second latch or blocking member 545 downward until the spring 541 seats the second latch or blocking member 545 in the cutout 22 in the arm 21.

Figure 26:
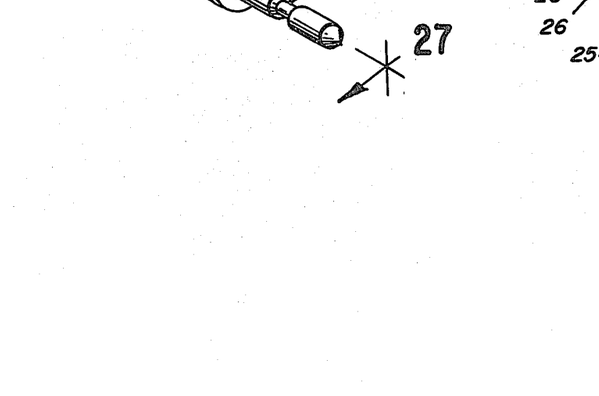
FIG. 26 is a perspective view of a seventh type of wiper arm which may be mounted on the improved adaptor according to the invention.
Figure 27:
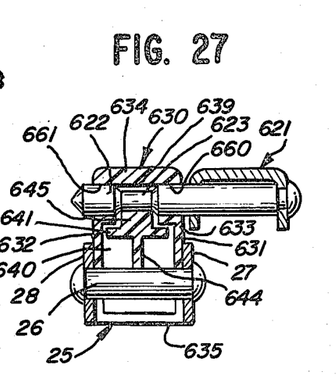
FIG. 27 is a vertical sectional view of a modified form of adaptor taken along line 27—27 of FIG. 26.

FIG. 26 shows still another type of wiper arm 621 which is used with a fifth embodiment of adaptor 630 shown in FIG. 27. The free end portion 620 of the wiper arm 621 is provided with a lateral or side pin 622 having a circular cross section and being provided in its central part with an annular groove 623.

In this embodiment, since the lateral pin 622 is perpendicularly secured to the wiper arm 621, said pin 622 is mounted on the adaptor 630 in such a way that it is parallel to the cross-pin or rivet 26 of the wiper blade 25. The pin 622 and the cross-pin or rivet 26 are, therefore, both situated in the same vertical plane.

The adaptor 630 has a body 631 comprised of a pair of side walls 632,633 joined by a top wall 634 and a bottom wall 635. A leaf spring 641 divides the body 631 into an upper cavity or portion 639 and a lower cavity or portion 640. The leaf spring 641 is connected at one end portion to the side walls 632,633 and is mounted in the body 631 in the same manner as described for leaf springs 41 and 141 in FIGS. 4 through 8 and 10 through 14, respectively. Aligned openings 660,661 are formed in the walls 632,633 in alignment with the upper cavity or portion 639. A first latch or blocking member 644 extends downwardly from the leaf spring 641 into the lower cavity or portion 640 and a second latch or blocking member 645 extends upward from the leaf spring 641 and has a width sufficient to seat in the groove 623 in the pin 622. The second latch or blocking member 645 overlaps the aligned openings 660,661. The first latch or blocking member 644 of the leaf spring 641 is adapted to rest on the cross-pin or rivet 26 of the wiper blade 25 and the second latch or blocking member 645 of said leaf spring 641 is adapted to nest in the annular groove 623 of the pin 622, thus preventing any displacement of said pin 622 transversely relative to the adaptor 630. In this embodiment, the openings 660, 661 are circular to permit rotation of the pin 622 in said openings 660,661.

The side pin 622 on the arm 621 is inserted into the opening 660 in the adaptor 630 whereupon the taper in the pin 622 will contact the second latch or blocking member 645 to depress the leaf spring 641 until the second latch or blocking member 645 can seat in the groove 623 in the side pin 622 with the end of the side pin 622 passing out the other opening 661 to secure the adaptor 630 to the arm end 620. The adaptor 630 is then assembled on the blade 25 by inserting the cross-pin 26 in the keyhole slot in the lower cavity or portion 640 of the adaptor 630 whereupon the cross-pin 26 blocks movement of the first latch or blocking member 644, the leaf spring 641 and the second latch or blocking member 645.

It is to be noted that in all mentioned embodiments, the adaptor 30,130,230,530,630 is free to rotate through a limited arc of movement relative to the cross-pin 26 of the wiper blade 25.

INDUSTRIAL APPLICABILITY

An improved adaptor is provided for connecting a wiper arm to a wiper blade wherein the connector on the arm is incompatible with the connector on the blade. Several popular arm ends have been illustrated as being connectable with one end portion of an adaptor by means of a spring-urged latch or blocking member. The arm end is positively locked to the adaptor by connecting the other end portion of the adaptor to a cross-pin on the blade. The positive lock of the arm end to the adaptor is accomplished by the cross-pin on the blade preventing another latch or blocking member carried by the spring from moving relative to the arm end thereby locking the arm end to the adaptor.

It will be understood that the present invention is not limited to the exact embodiments shown and described, but that various changes and/or modifications may be made without departing from the spirit and scope of the invention as defined in the appended claims.

Other aspects, objects and advantages of this invention can be obtained from a study of the drawings, the disclosure and the appended claims.

I claim:

1. An adaptor (30,130,230,530,630) mounted between a wiper blade (25) and a wiper arm (21,121,221,221A,321,421, 621), said wiper blade (25) having a crosspin (26) extending between a pair of spaced walls (32,33; 132–133; 232; 532; 632,633), said adaptor (30,130,230,530,630) comprising:

a body (31,131,231,531,631) having an upper portion (39,139,239,539,639) and a lower portion (40,140,240,540,640);

said upper portion (39,139,239,539,639) of said body (31,131,231,531,631) receiving any one of several types of wiper arm ends (20,120,220,220A,320,420,620);

said lower portion (40,140,240,540,640) of said body (31,131,231,531,631) receiving said cross-pin (26) of said blade (25);

spring means (41,141,241,541,641) integrally formed with said body (31,131,231,531,631) between said upper portion (39,139,239,539,639) and said lower portion (40,140,240,540,640);

first latch means (44,144,244,544,644) carried by said spring means (41,141,241,541,641) and cooperating with said cross-pin (26) to prevent deflecting of said spring means (41,141,241,541,641) with respect to the wiper arm end (20,120,220,220A,320,420,620); and second latch means (45,145,245,545,645) carried by said spring means (41,141,241,541,641) and cooperating with the wiper arm end (20,120,220,220A,320,420,620) to prevent displacement of said wiper arm end with respect to said adaptor (30,130,230,530,630).

2. An adaptor as claimed in claim 1 wherein said cross-pin (26) is accessible through an opening (29) provided on the top of the wiper blade (25) and wherein the wiper arm end (20) of the wiper arm (21) has the form of a flat bar providing transversely to its smallest dimension and at its underside (23), with a substantially semi-circular recess (22), and wherein:

said upper portion (39) is capable of receiving said flat bar wiper arm end (20) with practically no play, said second latch means (45) is carried by an upper side of said spring (41) and is seated in said recess (22) of the wiper arm end (20), said adaptor (30) is mounted on the wiper blade (25) by a snap-fit onto said cross-pin (26), and said first latch means (44) is carried by a lower side of said spring (41) and rests on said cross-pin (26) to thus prevent any movement of said spring (41).

3. An adaptor as claimed in claim 2, wherein said second latch means (45) is mounted on the spring (41) and is in the form of a non-flexible flat part having a shape to cooperate with the arm end (20) to deflect said spring (41) until said flat part nests into said recess (22) in the wiper arm (21).

4. An adaptor as claimed in claim 3 wherein said first latch means (44) is mounted on the spring (41) and is in the form of a non-flexible flat part which is located in the same plane as the non-flexible flat part corresponding to the second latch means (45) on said spring (41).

5. An adaptor as claimed in claim 1 wherein said cross-pin (26) is accessible through an opening (29) provided on the top of the wiper blade (25) and wherein the arm end (120) has the form of a U-shaped part provided with lugs (122) on both legs (149) of the "U" and has a tab (150) between said legs (149) having a frontal opening (151) through which passes a leaf spring (154) and wherein:

said upper portion (139) is capable of receiving the U-shaped part of the arm end (120) with practically no play, said upper portion (139) is provided with a transverse stop (156) to prevent the introduction of the arm end (120) beyond said stop (156), said second latch means (145) carried by said spring (141) is located in a way to block the tab (150) of the arm end (120) against said transverse stop (156), said adaptor (130) being mounted on the wiper blade (25) by being snap-fit onto said cross-pin (26), and said first latch means (144) carried by the spring (141) rests on said cross-pin (26) and thus prevents any movement of said spring (141).

6. An adaptor as claimed in claim 5 wherein said second latch means (145) is mounted on the spring (141) and is comprised of two parallel, non-flexible flat parts (145a,145b) lying in two planes perpendicular to the axis of said cross-pin (26) of the wiper blade (25).

7. An adaptor as claimed in claim 6 wherein said first latch means (144) is mounted on the spring (141) and is comprised of a non-flexible flat part which is located in a plane between the two parallel planes of said parallel flat parts (145a,145b) corresponding to the second latch means (145) of the spring (141).

8. An adaptor as claimed in claim 1 wherein said cross-pin (26) is accessible through an opening (29) provided on the top of the wiper blade (25) and wherein the free end portion (220,220A) of the wiper arm (221,221A) is hook-shaped and provided either with a rectangular opening (224) or with a second downturned portion (226) and a longitudinal slot (225) at the lower straight portion (223) and wherein:

said upper portion (239) is capable of receiving the two types of wiper arms (221,221A) with substantially no play, a bottom wall of said upper portion (239) is formed by said spring means (241) which is integrally formed at one end portion with said body, said second latch means (245) of said spring means (241) is located either in said rectangular opening (224) or in said longitudinal slot (225) of said wiper arms (221, 221A), and means carried by said adaptor for snap-fitting said adaptor onto said cross-pin (26) of the blade (25), said first latch means (244) of the spring means (241) rests on said cross-pin (26) and thus prevents any movement of said spring means (241) with respect to said wiper arms (221,221A).

9. An adaptor as claimed in claim 1 wherein said cross-pin (26) is accessible through an opening (29) provided on the top of the wiper blades (25) and wherein the free end portion (220,20) of the wiper arm (221,21) is either hook-shaped (220) and provided with a rectangular opening (224) in its lower straight portion or wherein the free end portion (20) of the wiper arm (21) has the form of a flat bar provided, transversally to its smallest dimension and at its inferior side, with a substantially semi-circular recess (22), and wherein:

said upper portion (539) is capable of receiving said flat bar arm (21) with practically no play, a top wall (534) of the adaptor has spaced ridges (533) provided on both sides of said top wall (534) to guide the upper straight portion (222) of said hook-shaped arm (221), a transverse section of said upper portion (539) comprises one narrow portion (547) that guides said flat bar arm (21) and one wide portion (548) that guides the lower straight portion (223) of said hook-shaped arm (221), a bottom wall of said upper portion (539) is formed by said spring means (541), said second latch means (545) of said spring means (541) is either located in said rectangular opening (224) of the hook-shaped arm (221) or in said semi-circular recess (22) of the flat bar arm (21), and means carried by said adaptor for snap-fitting said adaptor on said cross-pin (26) of the wiper blade (25), said first latch means (544) of the spring means (541) rests on said cross-pin (26) and thus prevents any movements of said spring means (541) with respect to said wiper arms (221,21).

10. An adaptor as claimed in claim 1 wherein said cross-pin (26) is accessible through an opening (29) provided on the top of the wiper blade (25) and wherein the free arm end (620) of the wiper arm (621) is provided with a lateral pin (622) having a circular cross section and having in its center portion an annular groove (623) and wherein:

said upper portion (639) is capable of rotatably receiving the lateral pin (622) of said arm end (620);

said second latch means (645) carried by said spring (641) is urged into the lower portion of the annular groove (623) of said lateral pin (622);

said adaptor (630) is mounted on the wiper blade (25) by a snap-fit onto said cross-pin (26), and said first latch means (644) carried by said spring (641) rests on said cross-pin (26) and thus prevents any movement of said spring (641).

11. An adaptor as claimed in claim 10 wherein said second latch means (645) carried by said spring (641) is a non-flexible flat part which is located in a plane lying transverse to the longitudinal axis of the lateral pin (622) of the arm end (620) and of the cross-pin (26) of the wiper blade (25).

12. An adaptor as claimed in claim 11 wherein said second latch means (645) is mounted on said spring (641) and engages in said groove (623) in said pin (622) to prevent any displacement of said lateral pin (622) in the direction of its longitudinal axis.

13. An adaptor as claimed in claim 10 wherein said first latch means (644) is mounted on said spring (641) and is a non-flexible flat part which is lying in a plane perpendicular to the plane containing the axis of the pin (622) and the axis of the pin (26).

14. An adaptor as claimed in claim 2 wherein the arm end (320) of the wiper arm (321) has the form of a flat bar having a boss (323) in the upper surface thereof and having a recess (322) in the lower surface thereof, said recess (322) aligning with said boss (323) and wherein said second latch means (45) mounted on said spring (41) engages in said recess (322) to retain said arm end (320) on said blade (25).

15. An adaptor as claimed in claim 14 wherein the upper wall of the upper portion of said adaptor is provided with a recess to receive said boss (323) on the arm end (320).

16. An adaptor as claimed in claim 2 wherein the arm end (420) of the wiper arm (421) has the form of a flat bar provided on both of its lateral sides with a recess (422), and wherein said second latch means (45) of the spring (41) engages in said recesses (422), said second latch means (45) being two rigid semi-circular bosses.

17. An adaptor as claimed in claim 1 wherein said adaptor is made completely of a plastic material.

* * * * *